United States Patent [19]

Luc

[11] 4,144,110
[45] Mar. 13, 1979

[54] DYNAMIC FRICTION BONDING PROCESS

[76] Inventor: Jane Luc, 18 rue Fourcroy, Paris 17e (Seine), France

[21] Appl. No.: 276,301

[22] Filed: Jul. 31, 1972

Related U.S. Application Data

[63] Continuation of Ser. No. 830,831, Jun. 5, 1969, abandoned.

[51] Int. Cl.² .................. B29C 27/08; B32B 31/16
[52] U.S. Cl. ........................... 156/73.5; 228/2; 228/112; 428/409; 428/543
[58] Field of Search .................. 29/470.3, 472.9; 156/73, 306, 323, 73.5, 153; 228/2; 51/281 R, 326; 428/141, 543, 409

[56] References Cited

U.S. PATENT DOCUMENTS

| 2,907,151 | 10/1959 | Peterson | 51/326 X |
|---|---|---|---|
| 3,418,196 | 12/1968 | Luc | 161/38 |
| 3,494,280 | 2/1970 | Kobiella | 100/2 |
| 3,554,845 | 1/1971 | Billett et al. | 156/580 |
| 3,745,641 | 7/1973 | Paolini | 29/470.3 |
| 3,759,770 | 9/1973 | Brown et al. | 156/73 |

FOREIGN PATENT DOCUMENTS

1080442  8/1967  United Kingdom.

Primary Examiner—Douglas J. Drummond
Assistant Examiner—J. J. Gallagher
Attorney, Agent, or Firm—Kenyon & Kenyon, Reilly, Carr & Chapin

[57] ABSTRACT

A process to create or modify adhesive properties between two materials without the use of any adhesive substance, characterized in that a solid surface belonging either to an intervening layer placed in contact with at least one of said materials or to at least one of said materials, is subjected to a friction created by means of a frictional tool.

9 Claims, 29 Drawing Figures

DYNAMIC FRICTION BONDING PROCESS

This is a continuation of application Ser. No. 830,831, filed June 5, 1969.

The present invention relates to a continuous or discontinuous process for the modification of surface properties of materials including the creation or improvement of adhesion between a wide range of materials. It also relates to apparatus for operation of said process and to numerous industrial applications of the said process and apparatus.

According to the process of the present invention, friction is created by high speed relative movement between a friction tool and a solid surface with which it is in contact. This surface can itself consist of a material whose adhesive properties are to be improved, or of an intervening layer of material placed over the material or materials to be treated, and for which it has no affinity.

In both cases, the solid surface to be treated can either be brought into prior contact with another solid surface in continuous or discontinuous (particulate) form, to which it is to adhere, or it can subsequently be brought into contact with such a solid surface. It can, in the same manner, be brought into contact with a continuous or discontinuous liquid phase prior to, or after treatment, so that the solid is wet by the liquid. On solidification of the liquid, for example by drying, a permament adhesive bond will result.

The object of the present invention is, in consequence, not only to create or improve the adhesive characteristics of materials, but to modify or to improve the wettable characteristics of materials. In consequence, it covers all processes related to sealing, welding, joining and lamination of materials and to the formation on substrates of coatings formed from particulate matter.

The present process usually requires application of some pressure, but this is in general much lower than that required by orthodox processes for the same type of application.

In the case of solid surfaces which are in mutual contact during application of friction according to the process, the applied pressure must be sufficient to create continuous reciprocal contact between the solid surfaces in the areas in which adhesion is to be secured. One can for instance use as a frictional tool a rotating head, which will cause a depression or aspiration to occur beneath it, and by attraction of the solid surfaces will act to ensure the aforementioned continuous contact. Such an effect may be increased by providing specific suction means within or on one side of the friction tool.

In the case of thin films of materials, the pressures required will generally be very low, but in order to secure the aforementioned continuous contact between thick flexible sheet materials, pressures are increased, although they are still below those required in orthodox bonding processes.

For example, for discontinuous sealing in small circular areas of 180 g/m2 and to a 100 g/m$^2$ kraft paper coated with polyethylene, pressures ranging from 5.1 kg/cm to 5.8 kg/cm are required for a sealing cycle of 0.07 s and 0.04 s.

With thick rigid materials, the aforementioned continuous contact is obtained with much higher pressures, which are applied either by means of the friction tool, or by an accessory material or device intervening between the tool and the material to be treated, or by an independent pressure source which will act from the side opposite to the friction tool, on the same side, and close to the friction tool, or simultaneously from both sides of the material(s) to be treated. In order to create a bond between steel plates coated with plastic material according to the method of this invention, the pressure will often reach 50 kg/cm$^2$, or more.

The invention applies to an extremely wide range of materials and it is even possible to secure adhesion between materials which heretofore have been considered difficult or impossible to seal or laminate or to render wettable by substances for which they have normally no affinity, in particular the polyolefin plastics. The process according to the invention improves the receptivity of inks, paints and coatings by these materials, and permits dyeing of synthetic fibres made of these materials, in particular polypropylene fibres.

For example, a polyethylene coating, extruded onto a paper web treated according to the process of the invention will have improved adhesion to the paper. This may permit reduction in the thickness of the polyethylene coating required, so that the finished product is not only of better quality but is less expensive than similar products now used in the packaging industry, especially as containers for liquids.

It should also be noted that materials, such as polytetrafluorethylene or uncoated regenerated cellulose which can be used either as the backing or as the nonadherent intervening material during the bonding of two layers of polyethylene and/or polypropylene, may themselves be bonded to each other or to other materials by increase of the pressure and/or the frictional speed and/or the duration of said friction.

In particular, equivalent results may be obtained by increasing the frictional speed and by simultaneously decreasing the duration of said friction; however, when relative frictional speeds are too low (well under 1 m/s), the effect is insufficient to create bonds, or will take too long.

Accordingly, a feature of the present process is that the relative speed between the part of the friction tool which creates the friction, and the surface it is treating, is equal to at least 1 m/s.

However, even when conditions of speed and duration of friction are themselves insufficient to create a bond, the adhesion may still be achieved by the introduction of auxiliary means, such as electrical fields, ultrasonic vibrations, or heat.

The application of an electrical field may precede and/or follow and/or be simultaneous with the application of friction. Such electrical fields may be applied in may different ways, for example by bringing either the friction tool, the intervening material, or the backing material, or several of these elements to a predetermined voltage, or by earthing them. Generally, only one of the aforementioned elements carries a charge, but a potential may be simultaneously applied to the friction tool and to either the backing or the intervening material.

Applications of electrical fields applied simultaneously with the friction are:

application of voltages of opposite polarities to the friction tool and to the backing;

application of voltages of opposite polarities to the intervening materials and to the backing material;

application of a voltage (above zero) to the friction tool: connection of the backing material to earth;

application of a voltage (above zero) to the backing material: connection of the intervening material to earth;

The applied potentials may be either direct or alternate current voltages with a value ranging from about 100 to 10,000 volts or more. In the case of an alternating voltage a wide range of frequencies may be used including those in the high and very high frequency range.

Indeed, said high frequencies may include not only those ranging from 15 to 60 megacycles second where it is known that bonding results may be obtained in some cases without application of a friction treatment but also frequencies well under 15 megacycles, and in particular those in the 1000 cycle per second to 1 megacycle range. Power supplied is in the order of 100 Watts to 10 kilowatts.

High frequencies are generally obtained through a generator. The power supply for the generator converts the voltage available at the 50 to 60-cycle mains to extremely high voltages of unfiltered direct current for use by the oscillator. The oscillator section converts the high voltage direct current to radio frequency energy of the correct frequency and voltage, controls the power level and supplies the energy to the device serving as an electrode, or as electrodes.

Applications of electrical fields applied before or after said friction are:

a. in order to achieve sealing or lamination, the materials to be treated (or those just treated) are passed between electrodes, or in the vicinity of at least one electrode, connected to a source of alternating or direct current. Such an electrode or electrodes are advantageously constituted by drums or rolls, the external surface of which is preferably made of a conductive material.

b. in order to further modify the adhesive and wettable characteristics of materials towards liquids, immediately before or after said frictional treatment, the materials are passed above or below an electrode or between a pair of electrodes connected to a source of alternating or direct current. One or more precharged electrodes may also be used. The electrodes mentioned above can be constituted by drums, rolls, plates or bars.

When the process is combined with a source of ultrasonic vibrations, the ultrasonic tool or device is placed on the opposite side of the work to the friction tool, so that the latter acts as an anvil. Alternatively, it is possible to use a support or anvil independently from the friction tool but located on the same side as the latter.

According to this invention, the surface properties of materials are modified to permit their cohesion, sealing or lamination to similar or dissimilar materials. The materials to be treated may be in the form of an assembly comprised of at least two layers of material, which, according to the present process may be laminated together to form multilayer or complex laminates or other products. In general, the adhesion is obtained between at least two contacting surfaces which are treated simultaneously, and one of the great advantages of the process is that a great number of layers may be simultaneously bonded.

It is also possible to achieve delayed bonding between two surfaces, at least one of which has already been treated, said surfaces being brought subsequently into mutual contact to achieve the bond.

The adhesion may be obtained in certain areas alone or over the whole area of a surface. This operation can be carried out continuously at high speed, for example at a rate of 20 to 200 m/min or more. This feature of the process is of importance to the packaging industry where longitudinal sealing of packages and over-wraps very often reduces the speed of the packaging machinery. In the production of all types of laminates for the packaging, textile, electronics and aeronautical industries the great advantages of the process are the strength of the bonds achieved, the speed of operation of the process, and the fact that adhesives are not required to join the laminate components.

This invention permits the adhesive or cohesive bonding of a wide range of materials, including at least two layers of plastic material in the form of film, plates, sheets, woven or unwoven fibres, particles, foams or other manufactured products, or between at least one layer of such a material and various other materials including metals, glass, ceramics, cellulosic materials such as wood, paper, cardboard, and cork, as well as woven and unwoven fibres, for example glass fibres, natural fibres, etc.

According to the process, not only thin plastic films used in the packaging industry can be sealed and laminated, but their surface properties may also be modified. This includes oriented or bi-oriented films of polyethylene, polypropylene, polyvinyl-chloride and polystyrene, which until now have been coated to render them sealable, an operation which adds considerably to their cost price. With the present process, all types of seals can be made on such films whether they are coated or uncoated.

Furthermore, the process of the invention is also capable of laminating several layers of different material in a single operation. For instance, a paper web, a film of plastic material and a metal foil can be transformed into a laminate for use in the packaging industry in a single operation. Outstanding results have been obtained by laminating plastic films to metals, for example by laminating an oriented polyester film (Polyethyleneglycol-terephthalate) to steel foil (which may be tin coated), or to copper or aluminum sheets.

The end product can be used in the electronic and aeronautical industries. Films composed of a copolymer of tetrafluorethylene or hexafluorpropylene and polyamide films have been very successfully laminated or joined to metals of different types. It is also possible to weld metal joints or parts to a variety of plastic products.

Metals, including dissimilar metals have been welded together: by the method according to the invention, for example a sheet of silver has been welded to a sheet of tin, and two layers of tin foil have been welded to each other.

Synthetic and natural fibres in the form of yarns, fibres, or of woven or unwoven fabrics have also been sealed or laminated by the process and it is even possible to seal two yarns together in their longitudinal direction. For example, it is possible to bond two elastomer yarns issuing from a die, or to bond fibres at cross-points in a web. Sealing or lamination of synthetic fibres to natrual fibres and to various other materials or substrates can be achieved. These applications are of interest to the textile industry.

All types of seals and welds may be made by the method according to this invention, this includes welding of tubing, piping and other products. Complex parts of a product, including moulded parts, can also be welded to each other by the process of the invention.

When the treatment in accordance with the process of the invention is used to modify the properties of solid surfaces, such as the characteristics of wettability, the treatment is usually applied before said liquids come into contact with the surfaces; however, in certain cases the liquid can contact the solid surface simultaneously with said treatment. For instance, the opposite surface of a material, or an assembly of materials to the surface undergoing frictional treatment may be in contact with a liquid.

The surfaces of materials such as plastic materials may also be coated or covered with particulate solid substances, for instance metallizing can be achieved by the addition of metallic particles before, during, or after friction of said surfaces. In this case, friction can be applied from one side of the material or assembly of materials to be treated, while the other side is in contact with a liquid or gaseous phase containing the metallic particles required to coat said material (or materials) with a very thin metallic film.

The aforementioned relative speed between the treated surface and the friction tool, may be of a constant sign, or alternately take plus or minus values. In other words, the treated material may be stationary while the friction tool moves across it in one direction, or the tool may be moved to and fro across the material; inversely, the material to be treated may be driven past the friction tool. Where the friction is created at the periphery of a rotating tool, said relative speed corresponds to the algebric sum of the specific peripheral linear speed of this rotating tool and of the speed of travel of the friction tool relative to the speed of the treated material. When there is no true motion of the treated surface, it is advantageous for a tool to be simultaneously rotative and mobile, so as to be able, on the one hand, to vary the sphere of action of said friction tool in relation to its speed of travel, and, on the other hand, to create, due to the rotating motion of said tool, a relative speed or resultant of sufficient value to effect adhesion.

In a continuous process, it is preferable to fix the rotating tool in a stationary position and to move the materials to be treated past it.

For such an application, the peripheral linear movement of said tool should preferably be in the same direction as that of the material to be treated.

As already mentioned, the surface to which the friction is applied may be that of an intervening layer of a material highly resistant to adhesion; in this case, the surface (or surfaces) the adhesive properties of which are to be modified, and which is, or are, hereinafter called "treated surface(s)" to clarify the description, are stationary with respect to the surface to which the friction is applied, i.e. either stationary or in stationary relationship to each other. The surface to which the friction is applied and the treated surface may also travel at differential speeds.

It should be well understood that the frictional source is exterior, to, or completely independent of the assembly of materials to be treated, in that it will not itself become part of the finished assembly and that it is itself unaffected or only slightly affected by the friction. Likewise, when an intervening layer of a material highly resistant to adhesion is used, it is obvious that it is completely independent of the final product and that it may be re-used for a further treatment cycle in accordance with the process. In some cases, contact between said intervening material and the material or materials to be treated is not essential.

In the same way, that a friction tool may be placed on both sides of the assembly to be treated, it is possible to interpose an intervening layer between said assembly and said friction tool on both sides of said assembly.

For the industrial application of the process, the relative movement between the frictional source and the assembly should, when none of the aforesaid accessory means (for instance an electrical field) are used, not be lower than 1 m/s, as indicated hereinabove. The frictional tool should be as smooth as possible and should not be made of rough or granular material, in order to avoid an excessive abrasion of the material composing said assembly, or the intervening material with which it comes into contact.

When the aforesaid assembly is made up of several layers of material, and when the external layer is for example a plastic film, the abrasive mechanical effect resulting from friction, may be reduced to a minimum by allowing said external film to take the same movement as the frictional tool until its complete adhesion with the other layers (the subjacent ones) is achieved.

For the continuous application of the process, it is advantageous to use a rotating friction tool (Friction head or roller) in a fixed position, the material to be sealed, laminated or otherwise treated moving past said tool. In some applications, the contour of the seal required may vary instead of being straight, and in this case, said friction tool may be given appropriate motion, perpendicular to the general movement of the film. To manufacture bags from an extruded tubular plastic film, the seals should be made perpendicular to the film movement and to achieve this without stopping the film, the friction tool must have a transverse movement with respect to that of the film, the angles of the required movement in both directions being calculated in relation to the speed of passage of the film.

The method according to the invention may also be applied in a continuous but intermittent manner, for example the frictional element is brought into intermittent contact with adjacent areas of the assembly for a given amount of time. Similar results may be obtained by using a backing provided with a raised pattern so that contact between the frictional tool and the assembly of materials to be treated occurs only in the areas corresponding to the raised pattern.

Regulation of the pressure exerted upon the assembly of materials to be treated is one of the parameters which permits control of the process according to this invention. It is obvious that for a given application of this invention, all parameters, including pressure, should remain constant or vary in a constant manner. In general, it is preferable to vary the relative speed of friction rather than the applied pressure. The pressure may however be regulated by means of spring systems incorporated into the frictional unit, either on the same side as that on which friction is carried out, or on the side of the subjacent backing. Of course, other mechanical systems which remain independent from the said frictional means may also be adapted for this purpose. The pressure exerted may also be applied through tensioning of the materials to be treated.

The treated surface may or may not be supported on the side of the assembly opposite to the friction head. This support or backing may be either rigid or flexible, hard or resilient, according to the application of the process which is contemplated. Such backing material may for instance be constituted by plastic materials or by a silicone type rubber, by polytetrafluoroethylene or by woven or unwoven glass-fibre fabric which may be coated with polytetrafluoroethylene, by coated or uncoated regenerated cellulose, by metal, by polyamides, etc. However, contrary to all orthodox processes, it is not always necessary to use a backing to the material or materials during treatment, the processes being capable of sealing over a wide variety of produce even when it is fragile or heat-sensitive. The process may also be operated over an elastic medium such as air or water, for example a seal may be made on, or against, a plastic bag containing a liquid such as water or the like.

When a support or backing is used, the latter may be stationary or may move with the treated materials. In the last case, the backing may be in the form of an endless belt which is actuated by a suitable motor or which is friction-driven, either by the passage of the materials to be treated beneath it, or by the friction source (if rotary), or by both.

The intervening layer, which may also be in form of an endless belt, is selected to provide protection of the materials to be treated, from any damaging mechanical effect which could be caused by direct friction of the surfaces by the tool. It is also selected from materials having no adhesive affinity for the surface of the assembly with which they come into contact. Another general requirement is that the mechanical and physical characteristics of such an intervening material should be unaffected or only slightly affected or altered by the frictional effect. This intervening layer will advantageously be constituted by one of the following materials: webs of woven glass-fibre, coated or not with fluorocarbon resins; polyamide films such as films based on $\epsilon$-caprolactam; uncoated films of regenerated cellulose, or coated for example with nitrocellulose or a vinyl-chloride-vinylidenechloride copolymer; various papers and fabrics including kraft paper, and thin webs, sheets and plates of metals such as aluminum, copper, brass, steel, tin and iron, as well as alloys of such metals; ceramics including metal ceramics based on beryllium; glass, including special glass, mica and crystalline materials such as quartz, etc.

Lubrication can be employed in conjunction with the process in the form of solid or liquid lubricants, applied either to the friction head, or to the intervening material, or both. Provision of such lubrication can prevent or reduce any mechanical damage or wear to the treated materials or to the apparatus, and/or control the temperatures produced by friction. To this effect, lubricating hydrocarbons may be used, as well as oils, waxes, water, polytetrafluoroethylene dispersions, and in certain cases plastic films or films coated with a plastic material.

The motors chosen to drive a rotating frictional tool should be of a type allowing high rotational speeds to be reached, in applications of the process for sealing, welding and laminating. Such motors not only include standard rotors, but also air-turbine type motors and high-frequency rotors either provided with a shaft or shaftless.

It should be noted that the endless belt type of intervening layer may be utilized in many cases. The friction tools employed may be of various types and in particular:

of the rotating type constituted by a tool or head in the shape of a cone, cylinder, torus, ring or sphere. The axis of rotation is the axis of the cone, cylinder, torus or ring, or of the diameter of the sphere. The friction generating area of such heads is situated on their external surfaces, or on the internal surface in the case of a torus or ring. Cylindrical shaped tools are in the form of rolls which may be more or less elongated. Either the narrow lateral surface of a disc shaped tool may be used to apply the friction or one of the faces of the disc.

A cross-section of such a disc can be the shape of a V, the summit of which allows linear friction to be applied.

of a stationary type, the friction resulting either from the movement of the surface receiving said friction and/or the treated surface; in this case, the proper friction tool is composed of either a sharp or a rounded tip, point or ball, a sharp edge, a pad, rod, bar, or ring in the shape of a torus or of a cylinder; an endless belt or band, a series of rollers, etc. An annular structure is particularly adaptable for treatment of cylindrical surfaces which may be introduced into the interior of the ring (for example: the surface of a tube placed coaxially to the ring); according to one variant of this set up, a tool of this type may also be rotated.

of an alternating type where the friction tool is applied to different areas of a surface in association with means providing an alternating rectilinear movement parallel to said surface.

Of course, all these types of movement may be combined with each other and/or with that of the surface which is to receive said friction.

The frictional head of the tool may be smooth or may be composed of a brush. The latter permitting uniform treatment of, or over, rough or uneven surfaces, for instance the over-wrap sealing of films covering fragile and uneven produce. To obtain similar results, with a smooth frictional head elastic mounting of the head is provided for.

The friction tools may be in the form of heads or rollers with a symmetrical or asymmetrical profile. They may be continuous or discontinuous, for example circular heads or rollers may be provided with teeth or perforations, or made of bristles, yarns or fibres, fur, felt, or deformable cellular materials, etc.

These tools permit strong overwrap sealing of packaging film in which uneven or irregularly shaped produce, such as bread or fruit and vegetables, are wrapped.

The angle of certain types of friction tool in relation to the treated surface may be altered and consequently it is possible to vary the active area of the frictional tool. The variation of tool angle constitutes another parameter for control of operating conditions of the process as well as control of the type of the resultant seal.

In general the speeds of rotation of the friction tools currently in use, will vary from a few hundred r.p.m. to several hundred thousand r.p.m., with operating diameters of the friction tools ranging from a few millimeters to several decimeters.

In the case of a stationary friction tool, the relative speed between the treated materials and the tool will preferably be in the range of at least 45 m/min.

The materials which can be utilized for the manufacture of the frictional tools may be selected from conductive, semiconductive, or insulating materials, and it is important to choose materials highly resistant to wear during frictional contact, either with the material which they are treating directly, or with the intervening material. The rate of wear of the material of which a given friction tool is made is in direct relationship to the material with which it is in frictional contact.

Materials suitable for the manufacture of frictional tool heads with smooth surfaces are chosen in preference from the following substances: polytetrafluorethylene, polyamide materials such as nylon or a polyimide material with the commercial name "Vespel," (Wilmington, Delaware, U.S.A.) manufactured by E. I. DUPONT de Nemours & Cie.; steel including special steels and mild steel; ceramics, including beryllium ceramics; alumina, some crystalline materials including diamond and quartz; acetal resins; copper loaded graphite; insulating products available under the commercial name of "TUFNOL," a laminated synthetic resin bonded material (for example an epoxy type resin) with a paper, fabric or asbestos base, manufactured by TUFNOL Ltd. (Perry Bar, Birmingham, Great Britain); and hard polyurethanes such as those commercially available under the name of "POLYVON." Brush type frictional units can be made of felt, nylon, natural or synthetic textile bristles, fibres or yarns.

Frictional tools made of polytetrafluorethylene resins filled with materials such as glass, graphite, molybdenumdisulfide and asbestos also give good results.

Among the metallic or metal-based materials which can be used for the manufacture of the frictional elements, are the following: the metal alloy commercially sold under the trademark "MONEL," ferrous materials and alloys, bronze, copper and copper loaded graphite, aluminium and alumina, boron and boron mitride, etc.

All these materials should be given as smooth a surface as possible, especially where thermoplastic materials are to be treated.

For the brush-type of frictional element, either natural or synthetic hair, bristle, fur, wool or metal wire can be used in numerous applications. It is also possible to use hog bristles or nylon fibres, separately or in combination. Soft furs are particularly useful for the treatment of materials to improve their adhesive properties prior to contact with a liquid phase. Fibrous materials may be used in woven or unwoven form, and expanded plastic materials such as polyester and polyurethane foams have also been used successfully.

The choice of the material of which a frictional tool is made is of course chosen in relation to the particular application of the process for which it is to be used.

The industrial apparatus herein described is used to operate the process of the invention either by hand, semi-automatically (the friction tool being handled by an operator) or entirely automatically, the operation being executed on a continuous or a discontinuous basis.

Such apparatus will include at least some of the following elements:
  a friction tool,
  means of travel of said friction tool,
  means for application and control of pressure:
    (a) of the friction tool upon the material or materials to be treated,
    (b) of independent pressure systems,
    (c) exerted by the subjacent backing of said materials (or materials), on the assembly,
  means for driving the rotating friction tool,
  means for removably mounting said friction tool,
  means for flexibly mounting said friction tool,
  means for adjusting the position of said friction tool,
  means to vary the rotational speed of said friction tool,
  means for lubricating the frictional unit,
  means for varying the angle of operation of said friction tool,
  means for bringing an intervening layer, placed upon the assembly to be treated, in contact with the friction tool, said intervening layer being either independent or incorporated into a suitable device permitting its continuous operation,
  means for conveying said intervening material and/or said materials to be treated and/or said backing,
  means of applying sufficient pressure to the surfaces which are to be bonded, to bring them into continuous mutual contact; said means may also include means for tensioning the aforesaid assembly,
  means for providing lubrication between the layer or layers of material to be treated and the intervening layer and/or between said intervening layer and said frictional head or element,
  means for winding and unwidening the aforesaid sheets,
  means for backing the assembly of materials to be treated,
  means for heating said backing,
  means for bringing to a predetermined electrical potential (negative, positive), or earthing:
    (a) the backing
    (b) the intervening material
    (c) the frictional head or element
    (d) an electrode located near the treated area.

It should also be noted that one or more friction tools located on the same, or on opposite sides, of the material (or materials) to be treated, may operate simultaneously; the latter method is preferred for the treatment of thick materials.

Applications of the process according to the invention include:
  the formation of seals comprising either continuous or limited areas; this application may be used to seal packages (hermetic closing of bags, sealing of films covering rigid products or packages, for instance of cardboard, in various shapes); the process may be applied continuously at high speed for this application even over delicate produce of complex or variable shape;
  lamination of similar or dissimilar films;
  lamination of a film to a similar or dissimilar substrate
  addition of inserts of various shape and size, in particular metallic inserts, into materials, joints or seals, or between the laminated materials;
  creation of ornamental patterns by the use of raised or textured backings;
  modification of the surface characteristics of materials, in particular wettability, in order to prepare said materials for a subsequent application: such as printing, dyeing, coating, chemical treatments, creation or activation of catalytic agents, etc.

The major industrial advantages of the present process, compared to orthodox processes, consist in the very wide range of materials to which said process may be applied, the high quality of the results and the high production rates of the process, and the fact that contrary to other processes low loads may be used for many applications without the necessity for a special support or backing to the materials or for a lower electrode. This process can also seal dirty or contaminated film, as well as films covering chilled, frozen, heat-sensitive or fragile produce. This application being of particular importance to the packaging industry.

Other advantages of the process according to the present invention are the simultaneous sealing (with high bond strength) of a differential number of plastic films, under the same operating conditions, without causing excessive sealing in the areas where the layers are less numerous. Heat-control as such, is not required for sealing applications of the process and "dwell" or "set up" times are not required.

Conditions of humidity or temperature do not affect operation of the process. This, and many other advantages make the process of interest to many industries, especially the packaging industry.

The low energy consumption of the process should also be taken into consideration, for example, continuous sealing of two films of polyethylene may be performed at a speed of 45 m/min., with a rotating type of friction tool driven by an input to the motor from the transformer of 100 volts, said motor consuming about 100 to 185 watts. the cost of the equipment is also very reasonable.

Seals may be performed by the process at higher speeds than by orthodox processes. For instance, seven to ten layers of nylon, each 0.03 mm thick or polyethylene films (50 g/m$^2$) may be sealed intermittently in one tenth of a second with a pressure of 2kg/cm$^2$, 200 volts being supplied to the rotating head drive. By increasing the rotational speed of the friction head and/or the pressure and/or by replacing the backing material by a second friction head located opposite the first one, it is possible to reduce the sealing time by half. Furthermore, under such conditions, continuous seals may be affected up to speeds reaching 150 m/min. or more.

The process also permits the control of the type of bond obtained. In this way cohesive bonds may be created in which the interfaces between the two layers of material disappear, and the intermolecular bonds established will be as strong as those within the materials themselves.

To obtain discontinuous seals of specific configuration by methods other than those using a backing bearing a pattern in relief, it is possible to employ a patterned metal die as an intervening material to which the friction is applied and which transmits the frictional effects through to the materials to be sealed or welded, in the areas corresponding to those of the raised profile of the die.

It is also possible to create adhesion or cohesion, or to seal or laminate materials considered as difficult or impossible to bond by known processes. Materials other than plastics may be sealed after coating with plastics, and plastic materials can be bonded to themselves or to substrates with or without a preliminary coating. An important technical progress is the fact that films which are usually either coated or treated to permit sealing or lamination, may be sealed or laminated by the present process without any preliminary coating or treatment. Typical examples of this type of film are oriented or bi-oriented polypropylene, polystyrene, polyester and polyvinylchloride films. The coating of these films adds substantially to their cost, however, all these films can be satisfactorily sealed or laminated by the present process whether they are coated or uncoated.

Other examples of materials which are reputed for their poor adhesive properties, but which can be sealed by the method of the invention, are as follows:
materials based upon fluorocarbon resins, for instance fluorinated hydrocarbon resins, or copolymers of tetrafluorethylene and of hexafluoropropylene, the polychlorotrifluoroethylenes, the polytetrafluorethylenes and the polyvinylfluorides. The last two materials cannot generally be sealed or welded by orthodox processes; but, according to this invention, it is nevertheless possible to seal and to laminate such materials, by selecting suitable conditions of treatment such as the relative speed of the friction tool and/or the applied load and/or the time of treatment.

Very strong bonds have been obtained between substrates and films of oriented polyester (polyethyleneglycol-terephthalate) and polyamide, including those based upon ε-caprolactam combined with a fluorocarbon resin. These films are used a great deal in the electronics industry. Products based upon soluble or water insoluble polyvinyl-alchol, ionomer resins and different copolymer films as well as coated and uncoated complex films or assemblies can also be bonded.

It is also possible to create a bond between the metal to metal interfaces of metallized film or between a metallized film and a non-metallized interface or film. The film can be composed of one of the aforementioned substances or of regenerated cellulose.

It is of course possible to bond all other thermoplastic materials as well as thermosetting products which are bonded prior to their complete polymerisation.

The following description contains non-limitative examples of embodiments of the apparatus used in conjunction with the process and its implementation. This description is made with reference to the accompanying drawings, in which.

Figure 1:
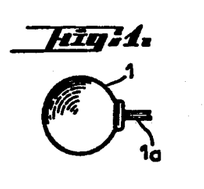
FIGS. 1 to 7 illustrate perspective views of various types of friction tools used to operate the process.
Figure 2:
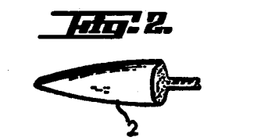

The friction tool shown in FIG. 1 is in the form of a ball of polytetrafluorethylene provided with a shank 1a In FIG. 2, the friction tool in the form of an elongated cone is made of felt or of asbestos leaded polytetrafluorethylene; this tool is of the rotating type.

Figure 3:
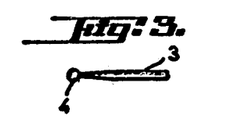

The friction tool shown in FIG. 3 need not be rotated but can remain stationary, friction being provided by the relative movement of the materials to be treated, or it can move relatively to the materials to be treated in either a continuous or discontinuous manner.

Figures 4, 5, 6, 11, 12, 13, 14:
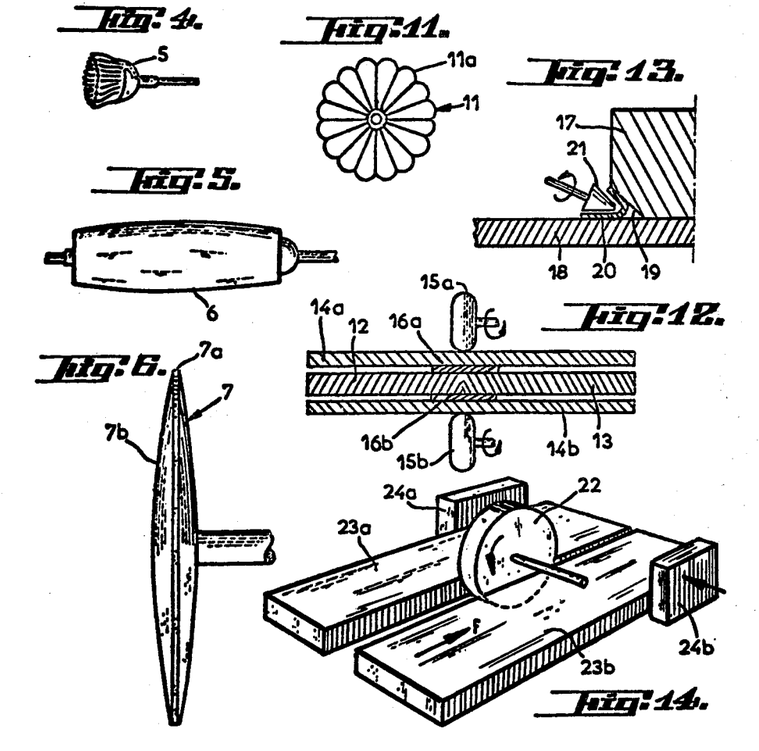
FIGS. 10 and 11 are respectively a perspective view and a side view showing two different types of friction tools which can be used to operate the process.
FIG. 12 shows a sectional view of equipment used to form a welded joint reinforced by the addition of two external layers of material.
FIG. 13 shows a sectional view of equipment used to form a welded joint of yet another type.
FIG. 14 presents a perspective view of a tool used to form a welded joint by bonding the edges of the joing after the frictional treatment.

The friction tool of FIG. 4 is in the form of a nylon brush 5.

In FIG. 5, the friction tool is made up of a contoured rotating felt cylinder 6.

In FIG. 6 a disc shaped friction tool 7 with convex faces is shown; its lateral edge 7a or convex face 7b being used to create the friction, for instance to perform a linear seal. Such a disc may, for example, be made of polytetrafluorethylene or a material commercially known as Tufnol, or of nylon, polyamide, felt, steel, etc.

Figure 7:
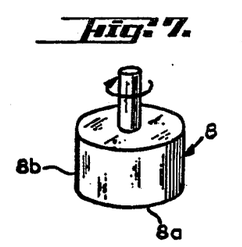

The rotating friction tool shown in FIG. 7 is in the shape of a metal cylinder or drum 8, for example of aluminum, steel or tungsten plated steel. The face of the tool 8a (which can alone be tungsten plated) is used for intermittent sealing (see FIG. 20), with the axis of rotation of the tool perpendicular to the surfaces to be sealed. When the axis of the tool is perpendicular to the surfaces to be sealed, the peripheral surface 8b of the cylinder 8 serves to generate the friction for applications to continuous line sealing.

Figure 8:
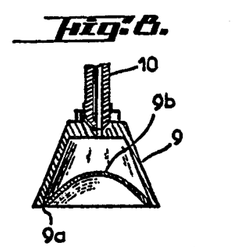
FIG. 8 shows a cross-section view of a friction tool, the latter being a variant of that illustrated in FIG. 7.
Figure 9:
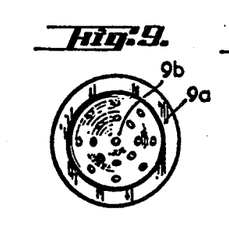
FIG. 9 is a view of the lower face of the tool shown in FIG. 8 and indicates the suction parts provided and could also correspond to the bottom face of the tool illustrated in FIG. 7.

In the variant of this tool shown in FIGS. 8 and 9, the rotating friction tool is constituted by a partially hollow metal drum 9 with a face in the form of a flat rim 9a which serves as a frictional surface, and of a central concave portion 9b provided with holes which permit suction to be applied through the shaft. This aspiratory device permits the intervening material or the materials to be treated, to be applied against the planar frictioning rim 9a of the friction tool.

In contrast to the frictional surface 8a of FIG. 7, the linear speed of the friction rim 9a of the tool is substantially constant during its frictional treatment of a surface (or surfaces) or of an intervening material.

The face 8a of friction tool 8 in FIG. 7, or the face 9a of that shown in FIG. 8 could also be flat and exhibit no concave recesses; however, they may also be provided with suction holes used for application such as those just indicated hereabove.

Figure 10:
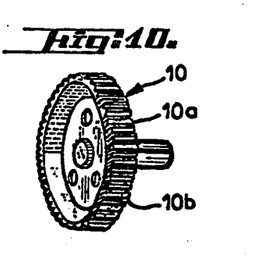

In FIG. 10, the friction tool 10 is provided, on its lateral surface 10a composing the frictional surface, with narrow round edged transverse ribs 10b. This rotating tool may be of metal or of nylon or of a combination of both these materials. Other forms of friction tools such as cylindrical rollers or drums may also be given a similar type of configuration.

FIG. 11 shows a friction tool composed of a metallic wheel 11, having an undulating lateral edge composed of a series of evenly distributed ripples 11a. The rotation of this wheel over the surface to be treated, or over an intervening layer covering the latter, produces an additional intermittent frictional effect which can be used to further improve results.

FIG. 12 shows two plastic sheets 12 and 13, for instance of a fluorethylene-propylene co-polymer, each being one millimeter thick, placed so that their edges are abutting in order that they may be welded together. Two bands 14a and 14b, 4 to 6 mm wide and made of a material such as woven glass-fibre coated with polytetrafluorethylene is placed on either side of the joint.

The lateral surfaces of rotating friction tools 15a and 15b are conjointly moved over the intervening materials in an area corresponding to the joint, at a speed ranging from about 1 mm/s to 2 cm/s. A welded joint is obtained in this manner, the intervening bands 14a and 14b of material highly resistant to adhesion being subsequently removed.

The diameter of the tools 15a and 15b is 3.5 cm, while their rotational speed is approximately 18,000 r.p.m.

According to an alternative embodiment, said friction tools rotate in a stationary position, and it is the assembly formed by the sheets 12 and 13 and by the bands 14a and 14b which is moved between the friction tools at the aforementioned speeds of 1 mm/s to 2 cm/s.

According to another variant, a band of additional material 16a is interposed between the films 12, 13 and the band 14a and a similar band 16b is interposed between said films 12, 13 and the band 14b. The bands 14a and 14b and the films 12 and 13 are preferably of the same material, and serve to reinforce the welded joint by cohesion created between the sheets 12 and 13, and bands 16a and 16b.

FIG. 13 presents a cylindrical element 17 which is to be welded to a base 18, by introduction into the bevelled groove 19 of a ribbon 20, of a fluorethylene-propylene co-polymer, said ribbon 20 being subjected to friction by means of a conical rotating friction tool 21 made of beryllium, similar to that represented in FIG. 4 but less elongated. The elements to be assembled are placed on a rotating work bench; in this way, a circular weld is accomplished.

In the device shown on FIG. 14, a friction tool in the shape of a rotating disc 22 is used, said disc acting by its two end faces. These end faces are applied to the abutting edges of two sheets 23a and 23b which are moved in the direction indicated by the arrow, whereas the axis of rotation of the tool remains stationary. The two abutting edges of the sheets 23a and 23b are pressed against each other by means of pressure units 24a and 24b immediately after their passage on either side of the friction tool. A very strong longitudinal butt joint is made between sheet 23a and 23b, in this manner.

Figure 15:
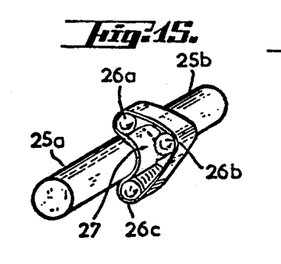
FIG. 15 represents a perspective view of a device used to weld two tubes together.

FIG. 15 shows two lengths of polypropylene tubing 25a and 25b each 7 cm in diameter with a wall thickness of 2 mm which are arranged with their matching edges abutting around a common mandrel. A friction tool is applied to the joint area over about half of the periphery of the tubes. This friction tool, of a complex structure, is composed of three cylindric rollers 26a, 26b and 26c, at least one of which is driven, and of a frictional unit 27 composed of an endless belt constituted, for example, by a steel or aluminum strip. The speed of this endless belt is approximately 8 m/s.

Figure 16:
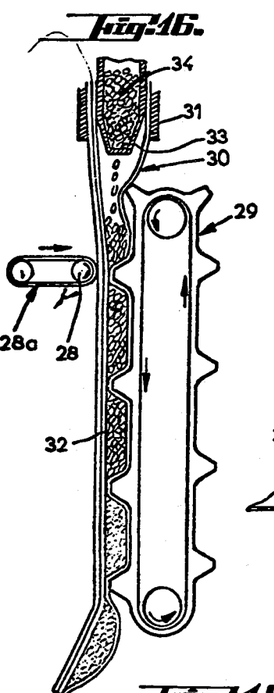
FIG. 16 is a sectional view of apparatus used to fill, form and seal packages made from a plastic sleeve.

The apparatus forming part of a form-fill-seal machine shown in FIG. 16 comprises a friction tool 28 and an endless belt 29 whose raised portions help to close the bags which have been formed into a tube or sleeve by known means, the flat film being guided around a hollow mandrel 33 which also serves to fill the packages. The Figure shows only the lower guide means 31.

The regularly spaced transverse raised portions of the endless belt also act to flatten the flim sleeve and to bring its opposing surfaces into contact at fixed intervals for transverse sealing of the bags. The hollow portions of the belt acting to protect the contents of the bag during this operation.

The transverse seals of the bags are made when raised portions of the belt are positioned opposite the high speed friction tool acting through an intervening material 28 in the form of a friction driven endless belt. The bags are filled with produce 34 from a hopper through the hollow mandrel 33. Endless belts 28 and 29 move in the same direction as the sleeve.

Figures 17, 22:
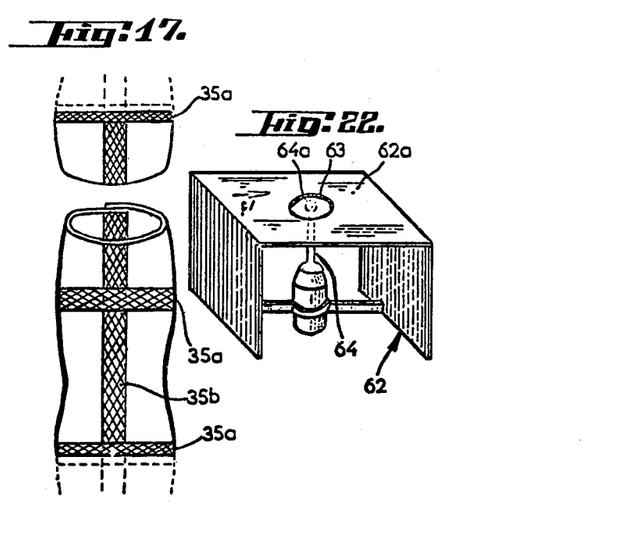
FIG. 17 illustrates packages which have been filled, formed and sealed by the apparatus of FIG. 16.
FIG. 22 shows a stationary tool fixed into the aperture of a work table.

As shown in FIG. 17, the edges of the sleeve 30 are made to overlap, to permit continuous longitudinal sealing 35b of the sleeves as it passes the friction head 28. The resultant bags are sectioned in the area of the transverse seals 35a. In this manner, packages can be filled, formed and hermetically sealed by a completely continuous in line process, in contrast to present discontinous methods.

According to one variant, it is possible to give the projecting portions of the endless belt 28 a suitable profile so that the sleeve is simultaneously cut while the transverse seals 35a are being made. In this case, it is preferable to make the longitudinal seal 35b prior to the transverse seal.

Figure 18:
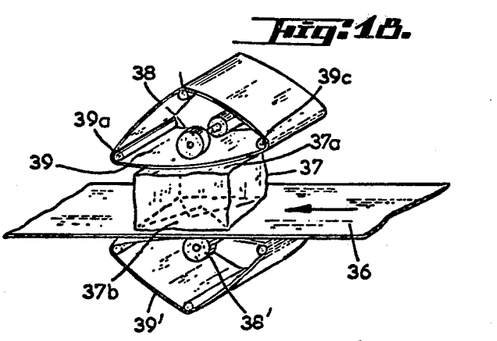
FIG. 18 illustrates a perspective view of a device for continuous sealing of overwrapped packages.

FIG. 18 illustrates the upper band of an endless belt 36 (for instance made of a sheet of cellulose) which continuously feeds packages 37 wrapped in a suitably folded plastic film, to the sealing unit so that end folds are located at faces 37a and 37b. The rotating-type friction tools 38 and 38' frictionally drive the intervening layers constituting endless belts 39 and 39' over idle rollers 39a, 39b, 39c. The band 36 of the endless belt and the package 37 are slightly compressed as they pass between the two friction tools while their end folds are being sealed.

Figure 19:
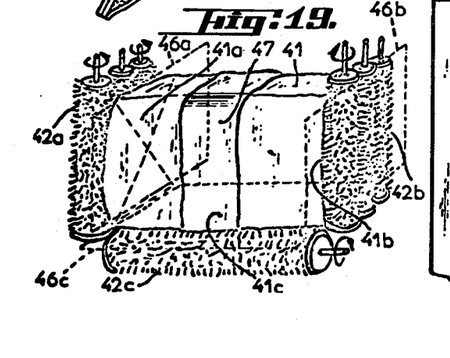
FIG. 19 illustrates in a perspective view an overwrap package containing bread being sealed by rotating brushes.

FIG. 19 shows a package of bread wrapped in a plastic film 41, the edges of which have been folded to overlap, for instance on the left face 41a, on the right face 41b, and on the bottom 41c. These bottom and end folds are sealed by means of several rotating brush rollers 42a, 42b and 42c. The brushes not only seal the film but frictionally drive the package forward. Endless belts carry the packages to and from the sealing station, but for reasons of clarity, these are not illustrated. Bands 46a, 46b and 46c, of a material highly resistant to adhesion may be interposed between the rotating brushes and the package. These bands are illustrated by broken lines on FIG. 18. The film 41 can be polyethylene, polypropylene, or coated regenerated cellulose. Although this overwrap package is soft and irregular, it can be well sealed by the frictional effect created by the brushes. A paper strip, indicating the characteristics of the produce, can be included in the bottom seal and is shown in 47.

Figures 20, 23, 24, 25:
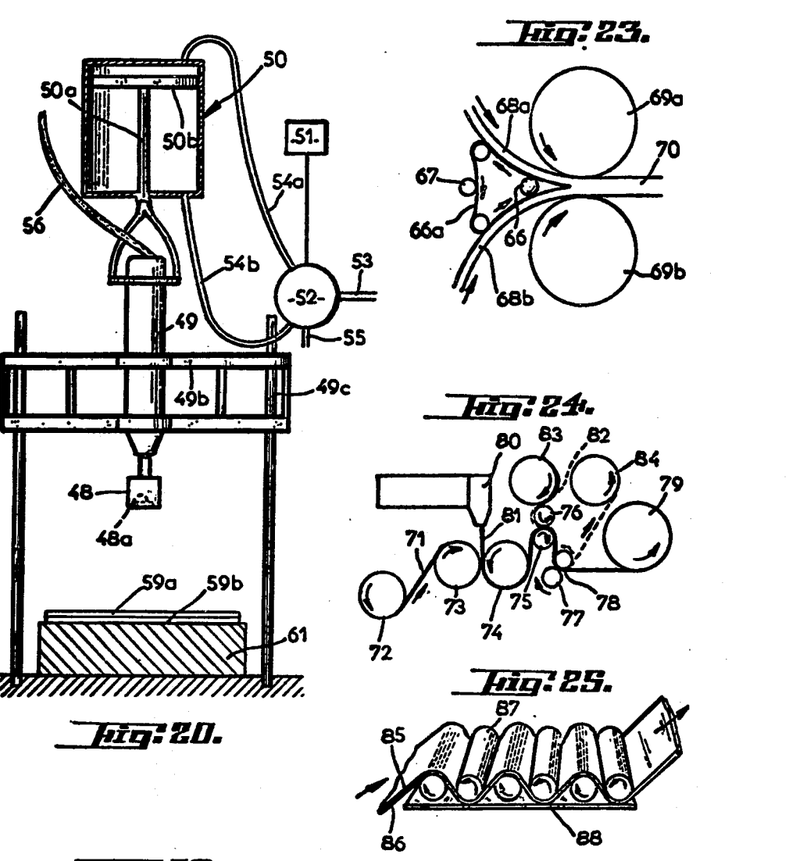
FIG. 20 illustrates apparatus used for intermittent sealing in circular areas.
FIG. 23 illustrates laminating apparatus, the friction being carried out after the materials composing the laminate have been brought into mutual contact.
FIG. 25 illustrates a perspective view of another type of laminating apparatus.

The apparatus shown in FIG. 20, is used for intermittent discontinuous sealing by means of a rotating type of friction tool 48 similar to that shown in FIG. 7 but provided with a recess 48a on its bottom face. This tool 48 is held by a stationary support 49 connected to the shaft 50a of a piston 50b operated by a double action pneumatic jack 50, the operating cycle of which is controlled by a timer 51 connected to an electro-valve 52 branched onto the compressed-air supply pipe 33 and the operating pipes 54a and 54b of the jack and the exhaust pipe 55.

The speed of rotation of the friction tool 48 is controlled through flexible cable 56, while the reciprocating vertical movement of the support 49a and of the chassis 49b, controlled by the jack 50, is guided by vertical shafts 49c.

Figure 21:
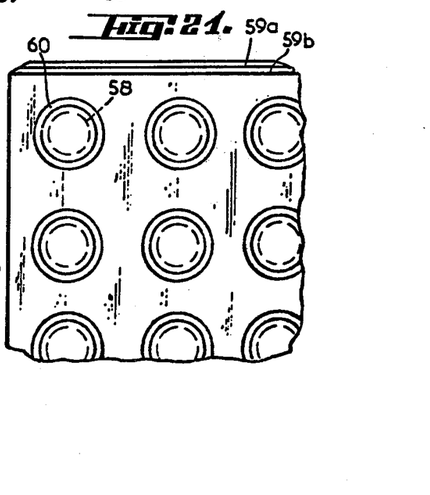
FIG. 21 illustrates two layers of material which have been sealed in circular areas by the apparatus of FIG. 20.

This arrangement allows produce such as pills 58 to be sealed between two plastic films or sheets 59a and 59b (see also FIG. 21). The circular area is indicated by reference numeral 60 on FIG. 21. When the support 59 is in a raised position, the sheets 59a and 59b (on which the pills 58 have been regularly distributed) are moved forward by a suitable mechanism over their stationary support 61.

FIG. 22 shows a work table 62 with a flat horizontal surface 62a on which packages or superimposed films can be sealed, for example, said films or packages can be manually or automatically moved in the direction shown by the arrow f'. The surface 62a has a cut-out area 63 to allow passage of the tip of a small metal ball 64a which is the frictional unit of the rotating tool 64, similar to that represented in FIG. 3. The support 65 of this tool is rigidly connected to the table 62 but if necessary it can be detachable. This device is well adapted to manual sealing or welding, or to other operations, because it allows adjustment of the direction in which the materials can be treated and the pressure with which they are applied against the tool.

The frictional element of the laminating apparatus shown in FIG. 23 is similar to that illustrated in FIG. 15. A roller 67 can be adjusted to provide changes in tension of the endless belt 66a and this in turn will result in changes of the pressure exerted by the endless belt 66a on the webs 68a and 68b, which travel at a constant speed, while frictional roller 66 is rotated at high speed. Facing sheets 68a and 68b are brought into contact between rollers 69a and 69b immediately after frictional treatment. A laminate 70 comprising two solidly adhering layers of material is obtained in this manner.

FIG. 24 shows another type of laminating apparatus. A substrate 71, such as a sheet of paper, is unrolled from a roller 72 and passes successively between rollers 73, 74, 75 and 76, 77 and 78 before being wound-up on the roller 79.

A liquid film 81 is extruded from extruder 50 onto the paper substrate 71 and passes between the rolls 73 and 74; where it is then cooled (for example by providing a system of cold water circulation in one or both of the rolls). At the level of rollers 75 and 76, an intervening web 82 unwound from roller 83, enters into contact with the solidified plastic film 81. The frictional unit of this equipment is roller 77 which rotates at high speed. When the assembly has passed between the rollers 77 and 78, the sheet 82 of material highly resistant to adhesion is easily separated from the coated substrate, and is wound up onto roller 84. Strong adhesion of the laminated coating and substrate is achieved in this manner.

The apparatus shown in FIG. 25 permits two films 85 and 86 to be laminated by the use of a set of parallel rollers 87, spaced at relatively close intervals and sufficiently close to plate 88 to provide a prolonged frictional effect, on films 85 and 86, One or several of the rollers may rotate at high speed. This will frictionally drive the films 85 and 86 but they can also be driven by other means provided before the first or after the last roller, and in this case, all rollers 87 would be mounted as idle rollers.

Figure 26:
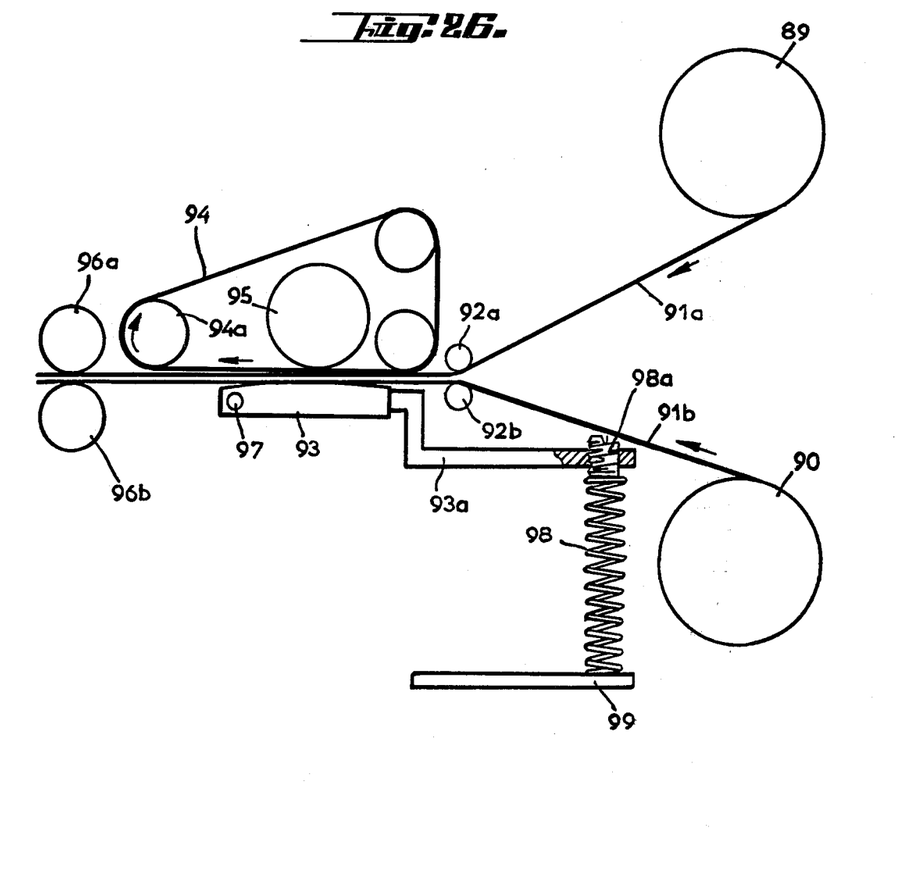
FIG. 26 illustrates in a schematic view apparatus for the continuous sealing of two materials, including means for applying pressure to the materials during the sealing operation.

The apparatus shown in FIG. 26 comprises two unwind rollers 89 and 90 for films 91a and 91b which pass between idle guide rollers 92a and 92b to between a backing support 93 and an endless belt 94 made of a material resistant to adhesion (metal or tetrafluorethylene coated glass cloth). A friction tool 95 similar to that shown in FIG. 6 or in FIG. 10 acts by rotating at high speed. The endless belt 94 can be friction driven by the movement of tool 95 or by the action of drive 94a. The resultant films, which have been longitudinally sealed, then pass between two other guide rollers 96a and 96b before being wound up on a roller which is not illustrated here.

The backing support 95 can be pivotable on its fixed axle 97, and is connected rigidly to a shaft 93a itself spring attached 98 to a frame 99. This spring 98 acts upon the backing support 93 to compress the films 91a and 91b and also the endless belt 94, between said support 93 and the friction tool 95. The spring 98 is secured to the shaft 93a by means of a threaded bolt 98a. The pressure exerted by the backing support 95 is regulated by this bolt.

Figure 27:
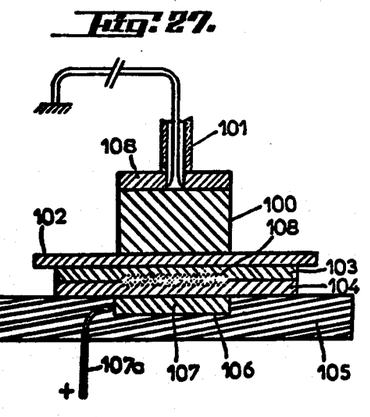
FIG. 27 is a sectional view of apparatus for intermittent sealing of thick materials in circular areas, by simultaneous application of friction and an electrical field.

In FIG. 27 is illustrated a cylindrical metallic friction tool 100 rotationally driven by its shaft 101. Said tool 100 comes into intermittent contact with an intervening layer 102 of electrically insulating material which in turn lies on two juxtaposed sheets 103 and 104 of insulating material, held in place on a suitable backing 105 also composed of insulating material. The backing 105 exhibits a substantially circular hollow area 106 in which a metal disc 107 is housed. This disc is charged to either a positive or negative potential by means of a suitable electrical connection 107a supplied with direct or alternating current. Moreover, the metal tool 100 is provided with a disc 108 of insulating material and with an insulating shaft 101 which contains an axial conduit for a wire, connected on the one hand, to the metal mass of the tool and, on the other hand, to earth. The rotating friction tool comes into intermittent contact with the insulating intervening plate, and the combined action of the tool, and the electrical field of plate 107, permits very rapid intermittent seals to be made in circular areas, in a continuous or discontinuous line. When the rotational arc of the friction tool is parallel to the assembly while it is travelling between plate 107 and intervening material 102, a high speed longitudinal seal will be made.

Figure 28:
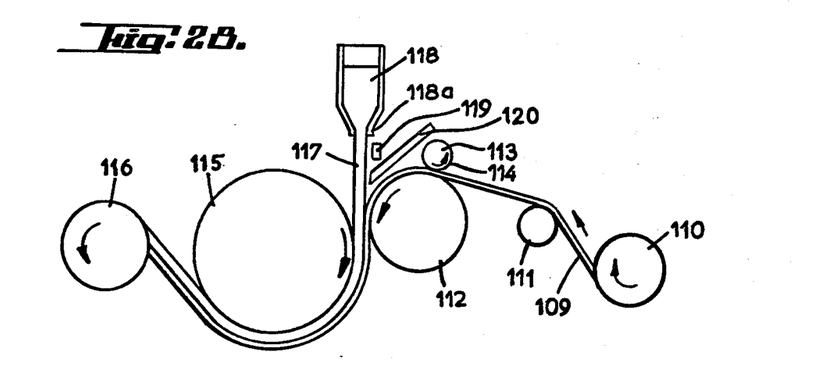
FIG. 28 schematically illustrates apparatus for improving adhesion between a coating and a substrate by the combined action of friction and an electrical field.

The apparatus in FIG. 28 is used to improve the adhesion of a coating to a substrate. For example, during coating of a 180 g/m² kraft paper with a freshly extruded film of molten polyethylene, the paper web 109 is unwound from roller 110 and passes over a guide an/or tensioning roller 111 before passing between the pinch roll 112 and the friction tool 113, which is constituted by a small circumference (approx. 10 cm) metal roller covered with fur or the like 114 which serves as the frictional surface. This frictional roller is driven at a speed of about 2000 rpm, counter-rotating to the direction of travel of the paper web, and under a load of a few pounds per square meter.

The paper web 109 then passes under a driven chill-roll 115 and onto the wind-up roller 116. A film of polyethylene extrudate 117, is extruded through a die lip 118a onto the paper web 109 at a point just above the nip of rolls 112 and 115 between which it is pressed. The polyethylene film is chilled by means of a cooling circuit provided within the chill roll 115. The paper web travels at a speed of approximately 40 m/min.

This operation creates a strong bond between the coating and the web. Comparison with untreated control samples shows an improvement of the adhesion of the polyethylene coating to the paper web as follows:

Average bond strengths indicated after fifteen tests:
untreated paper: 2.09 kg/cm²
treated paper: 3.50 kg/cm²

Tests were carried out on a Southwick-Perkins bond tester.

It is also possible to interpose a stationary sheet of paper or of aluminium between the friction roll 113 and the paper web 109, in order to avoid any direct frictioning of the surface of the paper web. Results continue to show an improvement over control samples.

In an alternative arrangement, an electrode 119 is placed as close as possible to the extruded polyethylene film, for example at a distance of 1.25 cm in a region where it has not yet joined the paper band 109. Such an electrode 119 is charged to a positive or negative d.c. potential of 1000 to 8000 volts. In order to improve results and to prevent chilling of the polyethylene film by the draft of the rotating roller 115, an insulating screen 120, for instance of wood, is placed between electrode 119 on the one hand, and the frictional roller and the paper web 109 on the other hand.

The bond strengths achieved are still further improved.

According to one variant, the electrode 119 and the screen 120 are suppressed, and the chill-roll 115 is connected to earth while the pinch roll 112 is provided with a metallic external surface which is brought under tension from a direct or alternating current, positive or negative, voltage input being in the range of 1000 to 10,000 volts.

Figure 29:
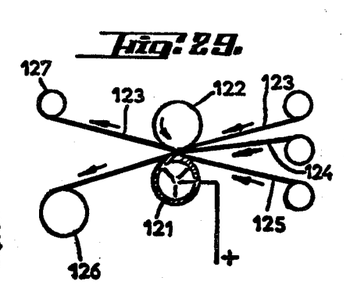
FIG. 29 illustrates laminating apparatus wherein an electrical field or heat are applied simultaneously with the friction.

In the laminating apparatus shown on FIG. 29, the electrode is made up by the external surface of the metallic roll 121 connected to a positive or negative potential preferably in the range of 500 to 5000 volts. The laminate is formed by the combined effect of the electrical field and the high speed rotating friction roller 122 in contact with the intervening layer 123 covering the film 124 which is to be laminated to the substrate 125. The two layer laminate produced in this manner is wound up on roller 126, while the intervening material is wound up on roll 127.

A number of non-restrictive examples summarizing some applications of the process according to the invention will now be given:

EXAMPLE 1

Continuous sealing of oriented polypropylene

The following assembly is composed of:
(a) a backing composed of a sheet of silicone-rubber
(b) two films of uncoated bi-oriented polypropylene, each 15 microns thick.

The friction tool used is a bell-shaped nylon brush, 1.5 cm in diameter and 0.3 cm wide with the axis of the brush parallel to the surface of the assembly which is moved at a speed of 13 m/min. to 23 m/min. beneath the brush, which is directly in contact with the external surface of one of the polypropylene films. The rotational speed of the brush is 27 r.p.m. and pressure applied 27,000 r.p.m.

A very strong line seal is created between the two polypropylene films. At a speed of 13 m/min., the shear strength of the seal is 2000 grams per 1½ inches, and the pool strength 1400 grams per 1½ inches.

EXAMPLE 2

Continuous sealing and cutting of bi-oriented polypropylene films

The treated assembly is identical to that of Example 1, but the friction tool used is a disc of laminated synthetic resin bonded material with a cotton fabric base. The disc (6.5 cm in diameter and 0.1 cm wide at its frictional edge) is rotated at a speed of 60,000 r.p.m., by an air turbine type motor. The axis of the tool is parallel to the surface of the assembly to which it applies low pressure (approx. 25 g/cm$^2$). The polypropylene films pass beneath it at a speed of 1m/s.

The two polypropylene films are simultaneously cut and sealed to each other by the frictional action, a welded joint being created on both sides of the cutting line. The shear strength of these seals is approximately 2000 to 3000 grams per 1½ inch width.

The axis of the friction head can also be fixed at different angles to the surface of the assembly to improve the cutting action.

It is also possible to use a film of regenerated cellulose coated with a vinyl-chloride-vinylidenchloride copolymer, or a web of capacitator tissue, between the disc and the polypropylene films which are still satisfactorily cut and sealed without the cellulose or tissue layer being affected.

This method can also be used to cut and seal two webs of woven synthetic textile fabric.

EXAMPLE 3

Continuous sealing of polyvinyl alcohol

The following assembly is composed of:
(a) a backing composed of a thin sheet of aluminium,
(b) four films of polyvinyl alcohol each 20 microns thick,
(c) an intervening layer composed of a fibre-glass fabric coated with polytetrafluoroethylene.

The friction tool is a disc having a polytetrafluorethylene base, and 3.2 cm in diameter and 2.2 mm in width, the axis of which is kept parallel to the treated surface at a rotational speed of approximately 15,000 to 20,000 r.p.m. The pressure of the tool on the aforesaid intervening layer is 400 g/cm$^2$ while it moves over the assembly at a speed of 3.3 cm/s. All components of the assembly are kept in a stationary position. The four polyvinyl alcohol films are sealed by a single passage of this tool over the assembly. The resultant seal has a shear strength of 2000 to 3000 grams per 1½ inch width and a peel strength of 500 to 1000 grams per 1½ inch width.

EXAMPLE 4

Bonding of two elastomer fibres

The following assembly is composed of:
(a) a backing of polished aluminium,
(b) two elastomer fibres are taped to the backing so that they can contact each other longitudinally,
(c) an intervening layer composed of a polyimide film or a fibre-glass fabric coated with polytetrafluoroethylene.

The friction tool is composed of a disc of a polyimide resin base material, 4 cm in diameter and 1 mm in width, the axis of which is kept parallel to the assembly surface. This disc rotates at a speed of 10,000 r.p.m. and moves at a speed of 1 cm/s. over said intervening layer in an area corresponding to the junction of the two fibres. The pressure exerted by the disc is in the order of 200 g/cm$^2$.

The two elastomer fibres are bonded longitudinally without loss of elasticity.

EXAMPLE 5

Discontinuous sealing of metals

The assembly is composed as follows:
(a) a backing sheet of an insulating material,
(b) one sheet of tin, 0.10 mm thick,
(c) one sheet of silver, 0.10 mm thick,
(d) a sheet of steel, 1 mm thick, coated with polytetrafluorethylene.

Apparatus similar to that illustrated in FIG. 20 may be used as the friction tool is in the shape of a steel drum coated with tungsten carbide, its diameter is 30 mm and its rotational speed 35,000 r.p.m. The axis of rotation of this disc is vertical to the work which is clamped under a pressure of 5 kg/cm$^2$. The friction tool is brought into intermittent contact with different areas of the assembly for four second periods, the pressure exerted by the tool on the steel sheet being 5 kg/cm$^2$. The sheet of silver is welded to the tin foil in areas corresponding to the diameter of the friction tool.

EXAMPLE 6

Discontinuous sealing of two pieces of kraft paper coated with polyethylene The device of FIG. 20 is again employed, the frictional surface of the tool being provided by the flat rim illustrated on FIG. 20. The type of friction tool illustrated in FIG. 8 may also be used. As already described with reference to FIG. 20, sealing is performed intermittently and the tool is lifted by means of the jack, the operating cycle of which is under automatic control when the assembly moves forward.

This operation results in an intermittent seal in a circular area.

The backing material is of hard rubber, while the two materials to be sealed are constituted by webs of kraft paper coated with polyethylene and weighing respectively 180 g/m$^2$ and 100 g/cm$^2$. The friction tool is of a steel coated with graphite on its frictional face. The tool is applied under a pressure of 5.4 kg/cm$^2$ for a period of 0.06 seconds, during which the two coated paper webs are sealed to each other in circular areas following a line, or in a two-dimensional network, according to the movements imparted to the treated materials.

EXAMPLE 7

Continuous lamination of a plastic film to a substrate

A web of a material highly resistant to adhesion such as a polytetrafluoroethylene-coated glass-fibre fabric or a metal sheet such as silicone coated aluminium and a web of polyvinylchloride, 0.10 mm thick, and a web of cotton fabric, are continuously wound off three stacked rollers. The three webs contact each other in the order indicated above before passing between three pairs of rollers each constituted by a supporting roller coated with hard rubber and a frictional roller, 12 mm in diameter and composed of highly polished stainless steel. Each roller rotates against the intervening material at a speed ranging from about 20,000 to 50,000 r.p.m. The pressure in the nip of each pair of rollers is approximately 5 lbs/cm$^2$, the assembly of three webs contacting each frictional roller over about one fourth of its periphery area. A laminate comprised of the film of polyvinyl chloride is bonded to the raised side of the fabric. Laminating speeds range from 20 to 40 m/min. Following lamination the product is wound onto a roll while the web of intervening material is separated from it and wound onto another roll.

EXAMPLE 8

This application is similar to that described in Example 7, but the supporting rollers are of metal heated to a temperature of 177° C. (350° F.), while the pressure is reduced by half. Nevertheless, similar results are achieved.

According to a variant, this method can be operated using a single pair of rolls instead of three pairs.

EXAMPLE 9

Results similar to those in Examples 7 and 8 may be obtained by using the apparatus illustrated in FIG. 29. The supporting roller acts as an electrode and is brought to a potential ranging from 500 to 5000 volts, with a direct or alternating current supply. Outstanding results may be obtained by using a 30 kw generator supplying a high frequency (radio frequency) current, for instance of approximately 18 megacycles per second.

EXAMPLE 10

Surface metallizing of an oriented polypropylene film

The equipment consists of wind-off and wind-on rollers for the polypropylene film (20 microns thick) and a friction roller covered with polyurethane foam or a mixture of soft nylon fibres and natural bristles. The frictional roller is driven at a speed of 10,000 to 20,000 r.p.m., and is in mere contact with the polypropylene film. A dust of fine aluminium particles is projected to the side of the film opposite to that to which friction is applied, said particles adhering to the propylene film owing to the effect of the frictional action exerted through the film. A fine metal coating is given to the film in this manner. To improve the adhesion of said particles, the metallised polypropylene film may again be passed between a frictional roll and a pinch roll.

EXAMPLE 11

Production of seals with specific profiles

Two high density polyethylene films, each 50 microns thick, are placed on a backing surface of an insulating material. A metal die bearing a profile in relief representing the shape of the seal which is required is clamped to the assembly composed of the two films.

Friction is applied to the back of the die by a large diameter felt tool: the two films are sealed together in areas corresponding to that of the die profile. The tool is rotated at a speed of 20,000 r.p.m. and dwell time is 4 seconds.

EXAMPLE 12

The procedure is similar to that described in Example 11, but the polyethylene films, covered by a polytetrafluorethylene coated fibre-glass fabric are clamped over the die on the side of its raised profile. The frictional treatment is then applied to the whole of the back of the die for a period of one second under a load of 2 lbs/cm$^2$. The rotatary speed of the tool is 70,000 r.p.m. The two polyethylene films are sealed in an area corresponding to the raised profile of the die.

EXAMPLE 13

Sealing of a web of polyvinylchloride to a nylon band

The assembly is composed as follows:

(a) a metal backing covered by hard rubber upon which a polytetrafluorethylene sheet reinforced by finely woven glass-fibres is glued, (b) a nylon band, 1 mm thick, (c) a web of polyvinylchloride, 0.05 mm thick containing a coloured filler, (d) a brass intervening layer in the form of an endless belt, 0.25 mm thick and driven at a substantially constant speed by the same motor as the aforementioned bands.

The apparatus illustrated in FIG. 26 can be used with a friction tool composed of a laminated synthetic resin bonded material with an asbestos base, said tool having a 5 cm diameter and a 2.8 cm width. The pressure exerted by the backing support on the assembly is in the order of 4 kg/cm$^2$. The web and band travel at a speed of approximately 2 m/mm, the nylon band being sealed to the polyvinyl-chloride web in an area about 2.5 cm wide.

While the invention has been illustrated and described in conjunction with a few preferred embodiments and examples of application thereof, it is to be understood that various changes and modifications may be resorted to without departing from the spirit and scope of the invention as defined by the following claims.

What is claimed is:

1. A process for improving the properties of a predetermined portion of a non-resin material in the solid state by which the material is enabled to bond to another substance, the non-resin solid state material being a material selected from the group consisting essentially of metals and ceramics and having a plurality of surfaces, a surface of the solid state material which is adjacent the predetermined portion having improved bonding properties in response to the process, the process comprising the step of:

treating adjacent the predetermined portion of solid state material with dynamic friction either:

(i) the solid state material which is to have the bonding properties of at least one of its surfaces improved, the treatment of the material in the solid state occurring upon any surface of the solid state material which is out of contact with any substance to which the solid state material is intended to be bonded, or;

(ii) a layer of material which is adjacent and unbonded to any surface of the solid state material which is to have the bonding properties of at least one of its surfaces improved, the layer being adapted to transmit the effects of the dynamic friction to any surface of the solid state material which is to have its bonding properties improved, the layer remaining unbonded to the solid state material after the treating, the treatment of the layer occurring during the condition in which the solid state material is to have its bonding properties improved is out of contact with a substance with which a bond is intended to be formed; and the treatment adjacent the predetermined portion of the solid state material with dynamic friction being carried out without any excessive abrasion of either the surface or the layer to which the dynamic friction is applied and including the application of dynamic friction produced by means of relative motion between a tool in engagement with either the surface of the solid state material or the layer of material adjacent any surface of the solid state material, said tool being applied with pressure sufficient to create, during the condition in which the tool is engaged to one of the surface and the layer, continuous reciprocal contact between the surface and the substance, the engagement of said tool and the portion of the tool applying dynamic friction being insufficient to cause excessive abrasion of either the surface or the layer with which said tool is in engagement and the surface speed of relative motion between said tool and either the surface or the layer being in a range extending upwardly from about 0.75 meters per second, the application of dynamic friction being in accordance with predetermined parameters which are necessary for the effecting of an improvement in the bonding properties of the solid state material, the improvement being effected substantially independently of the surface finish of the solid state material and without fusion of the solid state material, the parameters including the surface speed of the relative motion of, the pressure of, and the time duration of the engagement of the tool with either the solid state material or the layer, whereby the treating with dynamic friction improves the bonding properties of the non-resin solid state material.

2. A process for improving the properties of a predetermined portion of a non-resin material in the solid state by which the material is enabled to bond to another substance, the non-resin solid state material being a material selected from the group consisting essentially of metals and ceramics and having a plurality of surfaces, a surface of the solid state material which is adjacent the predetermined portion having improved bonding properties in response to the process, the process comprising the step of:

treating adjacent the predetermined portion of the solid state material with dynamic friction either:

(i) the solid state material which is to have the bonding properties of at least one of its surfaces improved, the treatment of the material in the solid state occurring upon any surface of the solid state material which is out of contact with any substance to which the solid state material is intended to be bonded, or;

(ii) a layer of material which is adjacent and unbonded to any surface of the solid state material which is to have the bonding properties of at least one of its surfaces improved, the layer being adapted to transmit the effects of the dynamic friction to any surface of the solid state material which is to have its bonding properties improved, the layer remaining unbonded to the solid state material after the treating, the treatment of the layer occurring during the condition in which the solid state material is to have its bonding properties improved is out of contact with a substance with which a bond is intended to be formed;

the treatment adjacent the predetermined portion of the solid state material with dynamic friction being carried out without any excessive abrasion of either the surface or the layer to which the dynamic friction is applied and including the application of dynamic friction produced by means of relative motion between a tool in engagement with either the surface of the solid state material or the layer of material adjacent any surface of the solid state material, the engagement of said tool and the portion of the tool applying dynamic friction being insufficient to cause excessive abrasion of either the surface or the layer with which said tool is in engagement and the surface speed of relative motion between said tool and either the surface or the layer being in a range extending upwardly from about 0.75 meters per second, the application of dynamic friction being in accordance with predetermined parameters which are necessary for the effecting of an improvement in the bonding properties of the solid state material, the improvement being effected substantially independently of the surface finish of the solid state material and without fusion of the solid state material, the parameters including the surface speed of the relative motion of, the pressure of, and the time duration of the engagement of the tool with either the solid state material or the layer, whereby the treating with dynamic friction improves the bonding properties of the non-resin solid state material; and applying a lubricant between the tool and one of the surface and the layer treated, the lubricant being applied in at least one of the conditions in which the tool and one of the surface and the layer treated are before and during engagement.

3. A process for improving the properties of a predetermined portion of a non-resin material in the solid state by which the material is enabled to bond to another substance, the non-resin solid state material being a material selected from the group consisting essentially of metals and ceramics and having a plurality of surfaces, a surface of the solid state material which is adjacent the predetermined portion having improved bonding properties in response to the process, the process comprising the step of:

treating adjacent the predetermined portion of the solid state material with dynamic friction either:

(i) the solid state material which is to have the bonding properties of at least one of its surfaces improved, the treatment of the material in the solid state occurring upon any surface of the solid state material which is out of contact with any substance to which the solid state material is intended to be bonded, or;

(ii) a layer of material which is adjacent and unbonded to any surface of the solid state material which is to have the bonding properties of at least one of its surfaces improved, the layer being adapted to transmit the effects of the dynamic friction to any surface of the solid state material which is to have its bonding properties improved, the layer remaining unbonded to the solid state material after the treating, the treatment of the layer occurring during the condition in which the solid state material is to have its bonding properties improved is out of contact with a substance with which a bond is intended to be formed, and;

the treatment adjacent the predetermined portion of the solid state material with dynamic friction being carried out without any excessive abrasion of either the surface or the layer to which the dynamic friction is applied and without fusion of the one surface of the material in the solid state and including the application of dynamic friction produced by means of relative motion between a tool in engagement with either the surface of the solid state material or the layer of material adjacent any surface of the solid state material, the dynamic friction being applied by a rotary element having its working surface disposed through a plurality of locations extending from adjacent the axis of rotation to the portion of the element of the greatest distance from the axis of rotation, the engagement of said tool and the portion of the tool applying dynamic friction being insufficient to cause excessive abrasion of either the surface of the layer with which said tool is in engagement and the surface speed of relative motion between said tool and either the surface or the layer being in a range extending upwardly from about 0.75 meters per second, the application of dynamic friction being in accordance with predetermined parameters which are necessary for the effecting of an improvement in the bonding properties of the solid state material, the improvement being effected substantially independently of the surface finish of the solid state material and without fusion of the solid state material, the parameters including the surface speed of the relative motion of, the pressure of, and the time duration of the engagement of the tool with either the solid state material or the layer, whereby the treating with dynamic friction improves the bonding properties of the non-resin solid state material.

4. A process according to claim 1 in which the application of dynamic friction by a rotary element having its working surface disposed through a plurality of locations extending from adjacent the axis of rotation to the portion of the element of the greatest distance from the axis of rotation comprises the application of dynamic friction by a ball.

5. A process according to claim 1 in which the application of dynamic friction by a rotary element having its working surface disposed through a plurality of locations extending from adjacent the axis of rotation to the portion of the element of the greatest distance from the axis of rotation comprises the application of dynamic friction by a conical element.

6. A process according to claim 1 in which the application of dynamic friction by a rotary element having its working surface disposed through a plurality of locations extending from adjacent the axis of rotation to the portion of the element of the greatest distance from the axis of rotation comprises the application of dynamic friction by a radially extending face portion of a cylinder revolving about the longitudinal axis thereof.

7. A process according to claim 6 in which the step of applying dynamic friction by a cylinder includes the application of a cylinder in which the radially extending face portion thereof is relieved to form a rim portion whose linear speed is substantially constant during frictional treatment of one of the surface and the layer.

8. A process according to the claim 6 further comprising the step of applying suction through the cylinder to enable one of the surface and the layer to be applied against the planar frictioning rim of the cylinder.

9. A process according to claim 1 in which the application of dynamic friction by a rotary element comprises the application of dynamic friction by a disc having an undulating peripheral portion and a series of substantially evenly distributed ripples extending across at least one face of the disc.

* * * * *

UNITED STATES PATENT AND TRADEMARK OFFICE
CERTIFICATE OF CORRECTION

PATENT NO. : 4,144,110

DATED : March 13, 1979

INVENTOR(S) : Jane Luc

It is certified that error appears in the above-identified patent and that said Letters Patent are hereby corrected as shown below:

Column 1, line 61, delete "g/m2" and insert --$g/m^2$--

Column 3, line 15, delete "Watts" and insert --watts--

Column 4, line 60, delete "natrual" and insert --natural--

Column 9, lines 58-59, delete "materials" and insert --material--

Column 10, line 16, delete "unwidening" and insert --unwinding--

Column 10, line 43, after "substrate," insert --;--

Column 11, line 16, delete "the cost" and insert --The cost--

Column 17, line 2, delete "86," and insert --86.--

Column 17, line 61, delete "an/or" and insert --and/or--

Column 20, line 8, delete "1cm/s." and insert --1cm/s--

Signed and Sealed this

Twenty-fifth Day of September 1979

[SEAL]

Attest:

LUTRELLE F. PARKER

*Attesting Officer*   *Acting Commissioner of Patents and Trademarks*